United States Patent
Arnold et al.

(10) Patent No.: US 9,261,004 B2
(45) Date of Patent: Feb. 16, 2016

(54) FILTER FOR FILTERING PARTICULATE MATTER FROM EXHAUST GAS EMITTED FROM A COMPRESSION IGNITION ENGINE

(71) Applicants: Louise Arnold, Melbourn (GB); Robert Brisley, Duxford (GB); Guy Richard Chandler, Little Eversden (GB); Andrew Francis Chiffey, Ware (GB); Keith Anthony Flanagan, Cambridge (GB); David Greenwell, Lower Cambourne (GB); Christopher Morgan, Royston (GB)

(72) Inventors: Louise Arnold, Melbourn (GB); Robert Brisley, Duxford (GB); Guy Richard Chandler, Little Eversden (GB); Andrew Francis Chiffey, Ware (GB); Keith Anthony Flanagan, Cambridge (GB); David Greenwell, Lower Cambourne (GB); Christopher Morgan, Royston (GB)

(73) Assignee: Johnson Matthey Public Limited Company, London (GB)

(*) Notice: Subject to any disclaimer, the term of this patent is extended or adjusted under 35 U.S.C. 154(b) by 0 days.

(21) Appl. No.: 14/107,607

(22) Filed: Dec. 16, 2013

(65) Prior Publication Data
US 2014/0186228 A1    Jul. 3, 2014

Related U.S. Application Data

(62) Division of application No. 13/203,631, filed as application No. PCT/GB2010/050347 on Feb. 26, 2010, now Pat. No. 8,608,820.

(30) Foreign Application Priority Data

Feb. 26, 2009  (GB) ................................ 0903262.4
Dec. 24, 2009  (GB) ................................ 0922612.7

(51) Int. Cl.
*B01D 24/00*   (2006.01)
*B01D 50/00*   (2006.01)
(Continued)

(52) U.S. Cl.
CPC .......... *F01N 3/2803* (2013.01); *B01D 53/9445* (2013.01); *B01J 23/40* (2013.01);
(Continued)

(58) Field of Classification Search
CPC ............ C04B 41/4596; C04B 41/4582; C04B 38/0009; F01N 3/0222; B01D 2255/902; B01D 2239/0478
See application file for complete search history.

(56) References Cited

U.S. PATENT DOCUMENTS 4,689,150 A * 8/1987 Abe et al. ...................... 210/490
5,114,581 A * 5/1992 Goldsmith et al. ............ 210/650
(Continued)

FOREIGN PATENT DOCUMENTS

JP    2002519186 A    7/2002
JP    2007501353 A    1/2007
(Continued)

*Primary Examiner* — Amber Orlando
(74) *Attorney, Agent, or Firm* — Gary D. Mangels

(57) ABSTRACT

A filter for filtering particulate matter (PM) from exhaust gas emitted from a compression ignition engine, which filter comprising a porous substrate having inlet surfaces and outlet surfaces, wherein the inlet surfaces are separated from the outlet surfaces by a porous structure containing pores of a first mean pore size, wherein the porous substrate is coated with a wash coat comprising a plurality of solid particles comprising a molecular sieve promoted with at least one metal wherein the porous structure of the wash coated porous substrate contains pores of a second mean pore size, and wherein the second mean pore size is less than the first mean pore size.

6 Claims, 5 Drawing Sheets

(51) Int. Cl.

| | |
|---|---|
| *B01D 39/06* | (2006.01) |
| *B01D 39/20* | (2006.01) |
| *B01D 39/14* | (2006.01) |
| *F01N 3/28* | (2006.01) |
| *B01J 23/46* | (2006.01) |
| *B01J 29/06* | (2006.01) |
| *B01J 29/08* | (2006.01) |
| *B01J 29/12* | (2006.01) |
| *B01J 29/14* | (2006.01) |
| *B01J 29/16* | (2006.01) |
| *B01J 29/40* | (2006.01) |
| *B01J 29/44* | (2006.01) |
| *B01J 29/46* | (2006.01) |
| *B01J 29/50* | (2006.01) |
| *B01J 29/54* | (2006.01) |
| *B01J 29/56* | (2006.01) |
| *B01J 29/70* | (2006.01) |
| *B01J 29/72* | (2006.01) |
| *B01J 29/74* | (2006.01) |
| *B01J 29/76* | (2006.01) |
| *B01J 29/78* | (2006.01) |
| *B01J 35/02* | (2006.01) |
| *B01J 35/04* | (2006.01) |
| *B01J 35/10* | (2006.01) |
| *B01J 37/00* | (2006.01) |
| *B01J 37/02* | (2006.01) |
| *F01N 3/035* | (2006.01) |
| *B01J 37/03* | (2006.01) |
| *B01J 23/40* | (2006.01) |
| *B01D 53/94* | (2006.01) |

(52) U.S. Cl.
CPC ............... *B01J 23/464* (2013.01); *B01J 29/06* (2013.01); *B01J 29/061* (2013.01); *B01J 29/082* (2013.01); *B01J 29/088* (2013.01); *B01J 29/126* (2013.01); *B01J 29/146* (2013.01); *B01J 29/166* (2013.01); *B01J 29/405* (2013.01); *B01J 29/44* (2013.01); *B01J 29/46* (2013.01); *B01J 29/505* (2013.01); *B01J 29/54* (2013.01); *B01J 29/56* (2013.01); *B01J 29/7007* (2013.01); *B01J 29/7057* (2013.01); *B01J 29/7215* (2013.01); *B01J 29/7415* (2013.01); *B01J 29/7615* (2013.01); *B01J 29/7815* (2013.01); *B01J 35/023* (2013.01); *B01J 35/04* (2013.01); *B01J 35/10* (2013.01); *B01J 37/0036* (2013.01); *B01J 37/0217* (2013.01); *B01J 37/0246* (2013.01); *B01J 37/038* (2013.01); *F01N 3/035* (2013.01); *B01D 53/9477* (2013.01); *B01D 2255/1021* (2013.01); *B01D 2255/1023* (2013.01); *B01D 2255/1025* (2013.01); *B01D 2255/50* (2013.01); *B01D 2255/908* (2013.01); *B01D 2255/9155* (2013.01); *B01D 2255/92* (2013.01); *B01D 2275/30* (2013.01); *B01D 2279/30* (2013.01); *F01N 2310/06* (2013.01); *F01N 2510/06* (2013.01); *F01N 2510/068* (2013.01); *Y02T 10/22* (2013.01); *Y02T 10/24* (2013.01); *Y10S 55/30* (2013.01)

(56) References Cited

U.S. PATENT DOCUMENTS

| | | | | |
|---|---|---|---|---|
| 5,198,007 | A * | 3/1993 | Moyer et al. | 55/523 |
| 6,264,045 | B1 * | 7/2001 | Wilson et al. | 210/491 |
| 7,179,430 | B1 * | 2/2007 | Stobbe et al. | 422/180 |
| 7,722,829 | B2 * | 5/2010 | Punke et al. | 422/180 |
| 7,972,400 | B2 * | 7/2011 | Mizuno et al. | 55/482 |
| 8,093,173 | B2 * | 1/2012 | Miyairi et al. | 502/178 |
| 8,318,286 | B2 * | 11/2012 | Patchett et al. | 428/117 |
| 2004/0033175 | A1 | 2/2004 | Ohno et al. | |
| 2005/0074374 | A1 * | 4/2005 | Ogura | 422/180 |
| 2005/0207946 | A1 * | 9/2005 | Asano et al. | 422/177 |
| 2006/0193757 | A1 * | 8/2006 | Li et al. | 422/177 |
| 2008/0148700 | A1 * | 6/2008 | Ziebarth | 55/523 |
| 2008/0264010 | A1 | 10/2008 | Mizuno et al. | |
| 2009/0129995 | A1 * | 5/2009 | Pfeifer et al. | 422/180 |
| 2009/0155135 | A1 * | 6/2009 | Li | 422/180 |
| 2010/0170230 | A1 * | 7/2010 | Chiffey et al. | 60/297 |
| 2010/0290963 | A1 * | 11/2010 | Andersen et al. | 423/213.2 |

FOREIGN PATENT DOCUMENTS

| | | |
|---|---|---|
| JP | 2008272664 A | 11/2008 |
| WO | 0001463 A1 | 1/2000 |
| WO | 0226351 A1 | 4/2002 |
| WO | 2005016497 A1 | 2/2005 |
| WO | 2008106518 A2 | 9/2008 |

* cited by examiner

FILTER FOR FILTERING PARTICULATE MATTER FROM EXHAUST GAS EMITTED FROM A COMPRESSION IGNITION ENGINE

CROSS-REFERENCE TO RELATED APPLICATIONS

This application is a Divisional application of the U.S. application Ser. No. 13/203,631 filed Jan. 6, 2012 now U.S. Pat. No. 8,608,820 which claims priority to U.S. National Phase application of PCT International Application No. PCT/GB2010/050347, filed Feb. 26, 2010, and claims priority of British Patent Application No. 0903262.4, filed Feb. 26, 2009, and British Patent Application No. 0922612.7, filed Dec. 24, 2009, the disclosures of all of which are incorporated herein by reference in their entirety for all purposes.

FIELD OF THE INVENTION

The present invention relates to a filter for use in treating particulate matter (PM) and oxides of nitrogen derived from a compression ignition engine.

BACKGROUND OF THE INVENTION

Compression ignition engines cause combustion of a hydrocarbon by injecting the hydrocarbon into compressed air and can be fuelled by diesel fuel, biodiesel fuel, blends of diesel and biodiesel fuels and compressed natural gas. The purpose of the present invention is different from the invention claimed in UK patent application no. 1003244.9 filed on 26 Feb. 2010 entitled "Filter". The purpose of the invention in that patent application is a filter for particulate matter in exhaust gas of a positive ignition engine.

Ambient PM is divided by most authors into the following categories based on their aerodynamic diameter (the aerodynamic diameter is defined as the diameter of a 1 g/cm$^3$ density sphere of the same settling velocity in air as the measured particle):
 (i) PM-10—particles of an aerodynamic diameter of less than 10 μm;
 (ii) Fine particles of diameters below 2.5 μm (PM-2.5);
 (iii) Ultrafine particles of diameters below 0.1 μm (or 100 nm); and
 (iv) Nanoparticles, characterised by diameters of less than 50 nm.

Since the mid-1990's, particle size distributions of particulates exhausted from internal combustion engines have received increasing attention due to possible adverse health effects of fine and ultrafine particles. Concentrations of PM-10 particulates in ambient air are regulated by law in the USA. A new, additional ambient air quality standard for PM-2.5 was introduced in the USA in 1997 as a result of health studies that indicated a strong correlation between human mortality and the concentration of fine particles below 2.5 μm.

Interest has now shifted towards nanoparticles generated by diesel and gasoline engines because they are understood to penetrate more deeply into human lungs than particulates of greater size and consequently they are believed to be more harmful than larger particles, extrapolated from the findings of studies into particulates in the 2.5-10.0 μm range.

Size distributions of diesel particulates have a well-established bimodal character that corresponds to the particle nucleation and agglomeration mechanisms, with the corresponding particle types referred to as the nuclei mode and the accumulation mode respectively (see FIG. 1). As can be seen from FIG. 1, in the nuclei mode, diesel PM is composed of numerous small particles holding very little mass. Nearly all diesel particulates have sizes of significantly less than 1 μm, i.e. they comprise a mixture of fine, i.e. falling under the 1997 US law, ultrafine and nanoparticles.

Nuclei mode particles are believed to be composed mostly of volatile condensates hydrocarbons, sulfuric acid, nitric acid etc) and contain little solid material, such as ash and carbon. Accumulation mode particles are understood to comprise solids (carbon, metallic ash etc.) intermixed with condensates and adsorbed material (heavy hydrocarbons, sulfur species, nitrogen oxide derivatives etc.). Coarse mode particles are not believed to be generated in the diesel combustion process and may be formed through mechanisms such as deposition and subsequent re-entrainment of particulate material from the walls of an engine cylinder, exhaust system, or the particulate sampling system. The relationship between these modes is shown in FIG. 1.

The composition of nucleating particles may change with engine operating conditions, environmental condition (particularly temperature and humidity), dilution and sampling system conditions. Laboratory work and theory have shown that most of the nuclei mode formation and growth occur in the low dilution ratio range. In this range, gas to particle conversion of volatile particle precursors, like heavy hydrocarbons and sulfuric acid, leads to simultaneous nucleation and growth of the nuclei mode and adsorption onto existing particles in the accumulation mode. Laboratory tests (see e.g. SAE 980525 and SAE 2001-01-0201) have shown that nuclei mode formation increases strongly with decreasing air dilution temperature but there is conflicting evidence on whether humidity has an influence.

Generally, low temperature, low dilution ratios, high humidity and long residence times favour nanoparticles formation and growth. Studies have shown that nanoparticles consist mainly of volatile material like heavy hydrocarbons and sulfuric acid with evidence of solid fraction only at very high loads.

Particulate collection of diesel particulates in a diesel particulate filter is based on the principle of separating gas-borne particulates from the gas phase using a porous barrier. Diesel filters can be defined as deep-bed filters and/or surface-type filters. In deep-bed filters, the mean pore size of filter media is bigger than the mean diameter of collected particles. The particles are deposited on the media through a combination of depth filtration mechanisms, including diffusional deposition (Brownian motion), inertial deposition (impaction) and flow-line interception (Brownian motion or inertia).

In surface-type filters, the pore diameter of the filter media is less than the diameter of the PM, so PM is separated by sieving. Separation is done by a build-up of collected diesel PM itself, which build-up is commonly referred to as "filtration cake" and the process as "cake filtration".

It is understood that diesel particulate filters, such as ceramic wallflow monoliths, may work through a combination of depth and surface filtration: a filtration cake develops at higher soot loads when the depth filtration capacity is saturated and a particulate layer starts covering the filtration surface. Depth filtration is characterized by somewhat lower filtration efficiency and lower pressure drop than the cake filtration.

Selective catalytic reduction (SCR) of NO$_x$ by nitrogenous compounds, such as ammonia or urea, was first developed for treating industrial stationary applications. SCR technology was first used in thermal power plants in Japan in the late 1970s, and has seen widespread application in Europe since the mid-1980s. In the USA, SCR systems were introduced for gas turbines in the 1990s and have been used more recently in coal-fired powerplants. In addition to coal-fired cogeneration plants and gas turbines, SCR applications include plant and refinery heaters and boilers in the chemical processing industry, furnaces, coke ovens, municipal waste plants and incinerators. More recently, $NO_x$ reduction systems based on SCR technology are being developed for a number of vehicular (mobile) applications in Europe, Japan, and the USA, e.g. for treating diesel exhaust gas.

Several chemical reactions occur in an $NH_3$ SCR system, all of which represent desirable reactions that reduce $NO_x$ to nitrogen. The dominant reaction is represented by reaction (1).

$$4NO + 4NH_3 + O_2 \rightarrow 4N_2 + 6H_2O \qquad (1)$$

Competing, non-selective reactions with oxygen can produce secondary emissions or may unproductively consume ammonia. One such non-selective reaction is the complete oxidation of ammonia, shown in reaction (2).

$$4NH_3 + 5O_2 \rightarrow 4NO + 6H_2O \qquad (2)$$

Also, side reactions may lead to undesirable products such as $N_2O$, as represented by reaction (3)

$$4NH_3 + 5NO + 3O_2 \rightarrow 4N_2O + 6H_2O \qquad (3)$$

Various catalysts for promoting $NH_3$—SCR are known including $V_2O_5/WO_3/TiO_2$ and transition metal/zeolites such as Fe/Beta (see U.S. Pat. No. 4,961,917) and transition metal/ small pore zeolites (see WO 2008/132452).

EP 1663458 discloses an SCR filter, wherein the filter is a wallflow monolith and wherein an SCR catalyst composition permeates walls of the wallflow monolith. The specification discloses generally that the walls of the wallflow filter can contain thereon or therein (i.e. not both) one or more catalytic materials. According to the disclosure, "permeate", when used to describe the dispersion of a catalyst slurry on the wallflow monolith substrate, means the catalyst composition is dispersed throughout the wall of the substrate.

WO 2008/136232 A1 discloses a honeycomb filter having a cell wall composed of a porous cell wall base material and, provided on its inflow side only or on its inflow and outflow sides, a surface layer and satisfying the following requirements (1) to (5) is used as DPF: (1) the peak pore diameter of the surface layer is identical with or smaller than the average pore diameter of the cell wall base material, and the porosity of the surface layer is larger than that of the cell wall base material; (2) with respect to the surface layer, the peak pore diameter is from 0.3 to less than 20 μm, and the porosity is from 60 to less than 95% (measured by mercury penetration method); (3) the thickness (L1) of the surface layer is from 0.5 to less than 30% of the thickness (L2) of the cell wall; (4) the mass of the surface layer per filtration area is from 0.01 to less than 6 mg/cm$^2$; and (5) with respect to the cell wall base material, the average pore diameter is from 10 to less than 60 11 m, and the porosity is from 40 to less than 65%. See also SAE paper 2009-01-0292.

NOx absorber catalysts (NACs) are known e.g. from U.S. Pat. No. 5,473,887 and are designed to adsorb nitrogen oxides (NOx) from lean exhaust gas (lambda>1) and to desorb the NOx when the oxygen concentration in the exhaust gas is decreased. Desorbed NOx may be reduced to $N_2$ with a suitable reductant, e.g. gasoline fuel, promoted by a catalyst component, such as rhodium, of the NAC itself or located downstream of the NAC. In practice, control of oxygen concentration can be adjusted to a desired redox composition intermittently in response to a calculated remaining NOx adsorption capacity of the NAC, e.g. richer than normal engine running operation (but still lean of stoichiometric or lambda=1 composition), stoichiometric or rich of stoichiometric (lambda<1). The oxygen concentration can be adjusted by a number of means, e.g. throttling, injection of additional hydrocarbon fuel into an engine cylinder such as during the exhaust stroke or injecting hydrocarbon fuel directly into exhaust gas downstream of an engine manifold.

A typical NAC formulation includes a catalytic oxidation component, such as platinum, a significant quantity, i.e. substantially more than is required for use as a promoter such as a promoter in a TWC, of a NOx-storage component, such as barium, and a reduction catalyst, e.g. rhodium. One mechanism commonly given for NOx-storage from a lean exhaust gas for this formulation is:

$$NO + \tfrac{1}{2}O_2 \rightarrow NO_2 \qquad (4); \text{ and}$$

$$BaO + NO_2 + \tfrac{1}{2}O_2 \rightarrow Ba(NO_3)_2 \qquad (5),$$

wherein in reaction (4), the nitric oxide reacts with oxygen on active oxidation sites on the platinum to form $NO_2$. Reaction (5) involves adsorption of the $NO_2$ by the storage material in the form of an inorganic nitrate.

At lower oxygen concentrations and/or at elevated temperatures, the nitrate species become thermodynamically unstable and decompose, producing NO or $NO_2$ according to reaction (6) below. In the presence of a suitable reductant, these nitrogen oxides are subsequently reduced by carbon monoxide, hydrogen and hydrocarbons to N2, which can take place over the reduction catalyst (see reaction (5)).

$$Ba(NO_3)_2 \rightarrow BaO + 2NO + 3/2O_2 \text{ or } Ba(NO_3)_2 \rightarrow BaO + 2NO_2 + \tfrac{1}{2}O_2 \qquad (6); \text{ and}$$

$$NO + CO \rightarrow \tfrac{1}{2}N_2 + CO_2 \qquad (7);$$

(Other reactions include $Ba(NO_3)_2 + 8H_2 \rightarrow BaO + 2NH_3 + 5H_2O$ followed by $NH_3 + NO_x \rightarrow N_2 + yH_2O$ or $2NH_3 + 2O_2 + CO \rightarrow N_2 + 3H_2O + CO_2$ etc.).

In the reactions of (4)-(7) above, the reactive barium species is given as the oxide. However, it is understood that in the presence of air most of the barium is in the form of the carbonate or possibly the hydroxide. The skilled person can adapt the above reaction schemes accordingly for species of barium other than the oxide and sequence of catalytic coatings in the exhaust stream.

In Europe, since the year 2000 (Euro 3 emission standard) emissions are tested over the New European Driving Cycle (NEDC). This consists of four repeats of the previous ECE 15 driving cycle plus one Extra Urban Driving Cycle (EUDC) with no 40 second warm-up period before beginning emission sampling. This modified cold start test is also referred to as the "MVEG-B" drive cycle. All emissions are expressed in g/km.

The Euro 5/6 implementing legislation introduces a new PM mass emission measurement method developed by the UN/ECE Particulate Measurement Programme (PMP) which adjusts the PM mass emission limits to account for differences in results using old and the new methods. The Euro 5/6 legislation also introduces a particle number emission limit (PMP method), in addition to the mass-based limits.

Emission legislation in Europe from 1 Sep. 2014 (Euro 6) requires control of the number of particles emitted from both diesel and gasoline passenger cars. For diesel EU light duty vehicles the allowable limits are: 500 mg/km carbon monoxide; 80 mg/km nitrogen oxides (NOx); 170 mg/km total hydrocarbons+NOx; 4.5 g/km particulate matter (PM); and particulate number standard of $6.0 \times 10^{11}$ per km. The present specification is based on the assumption that this number will be adopted in due course.

A difficulty in coating a filter with a catalyst composition is to balance a desired catalytic activity, which generally increases with washcoat loading, with the backpressure that is caused by the filter in use (increased washcoat loading generally increases backpressure) and filtration efficiency (backpressure can be reduced by adopting wider mean pore size and higher porosity substrates at the expense of filtration efficiency).

SUMMARY OF THE INVENTION

We have now discovered, very surprisingly, that by coating a filter substrate monolith on a surface thereof with a washcoat, as opposed to permeating the filter walls with the washcoat as is disclosed in EP 1663458 it is possible to achieve a beneficial balance of backpressure, filtration and catalytic activity. Moreover, we have found that by appropriate selection of molecular sieve size it is possible to tune the backpressure of the filter at a similar catalytic activity, thus increasing design options.

According to one aspect, the invention provides a filter for filtering particulate matter (PM) from exhaust gas emitted from a compression ignition engine, which filter comprising a porous substrate having inlet surfaces and outlet surfaces, wherein the inlet surfaces are separated from the outlet surfaces by a porous structure containing pores of a first mean pore size, wherein the porous substrate is coated with a washcoat comprising a plurality of solid particles comprising a molecular sieve promoted with at least one transition metal wherein the porous structure of the washcoated porous substrate contains pores of a second mean pore size, and wherein the second mean pore size is less than the first mean pore size.

BRIEF DESCRIPTION OF THE DRAWINGS

In order that the invention may be more fully understood, reference is made to the accompanying drawings wherein.

DETAILED DESCRIPTION OF THE INVENTION

Mean pore size can be determined by mercury porosimetry.

It will be understood that the benefit of the invention is substantially independent of the porosity of the substrate. Porosity is a measure of the percentage of void space in a porous substrate and is related to backpressure in an exhaust system: generally, the lower the porosity, the higher the backpressure. However, the porosity of filters for use in the present invention are typically >40% or >50% and porosities of 45-75% such as 50-65% or 55-60% can be used with advantage. The mean pore size of the washcoated porous substrate is important for filtration. So, it is possible to have a porous substrate of relatively high porosity that is a poor filter because the mean pore size is also relatively high.

The porous substrate can be a metal, such as a sintered metal, or a ceramic, e.g. silicon carbide, cordierite, aluminium nitride, silicon nitride, aluminium titanate, alumina, cordierite, mullite e.g., acicular mullite (see e.g. WO 01/16050), pollucite, a thermet such as $Al_2O_3$/Fe, $Al_2O_3$/$N_1$ or $B_4C$/Fe, or composites comprising segments of any two or more thereof. In a preferred embodiment, the filter is a wall-flow filter comprising a ceramic porous filter substrate having a plurality of inlet channels and a plurality of outlet channels, wherein each inlet channel and each outlet channel is defined in part by a ceramic wall of porous structure, wherein each inlet channel is separated from an outlet channel by a ceramic wall of porous structure. This filter arrangement is also disclosed in SAE 810114, and reference can be made to this document for further details. Alternatively, the filter can be a foam, or a so-called partial filter, such as those disclosed in EP 1057519 or WO 01/080978.

In one embodiment, the first mean pore size e.g. of surface pores of the porous structure of the porous filter substrate is from 8 to 45 µm, for example 8 to 25 µm, 10 to 20 µm or 10 to 15 µm. In particular embodiments, the first mean pore size is >18 µm such as from 15 to 45 µm, 20 to 45 µm e.g. 20 to 30 µm, or 25 to 45 µm.

In embodiments, the filter has a washcoat loading of >0.25 g in$^{-3}$, such as >0.50 g in$^{-3}$ or ≥0.80 g in$^{-3}$, e.g. 0.80 to 3.00 g in$^{-3}$. In preferred embodiments, the washcoat loading is >1.00 g in$^{-3}$ such as ≥1.2 g in$^{-3}$, >1.5 g in$^{-3}$, >1.6 g in$^{-3}$ or >2.00 g in$^{-3}$ or for example 1.6 to 2.4 g in$^{-3}$. In particular combinations of filter mean pore size and washcoat loading the filter combines a desirable level of particulate filtration and catalytic activity at acceptable backpressure.

Figure 1:
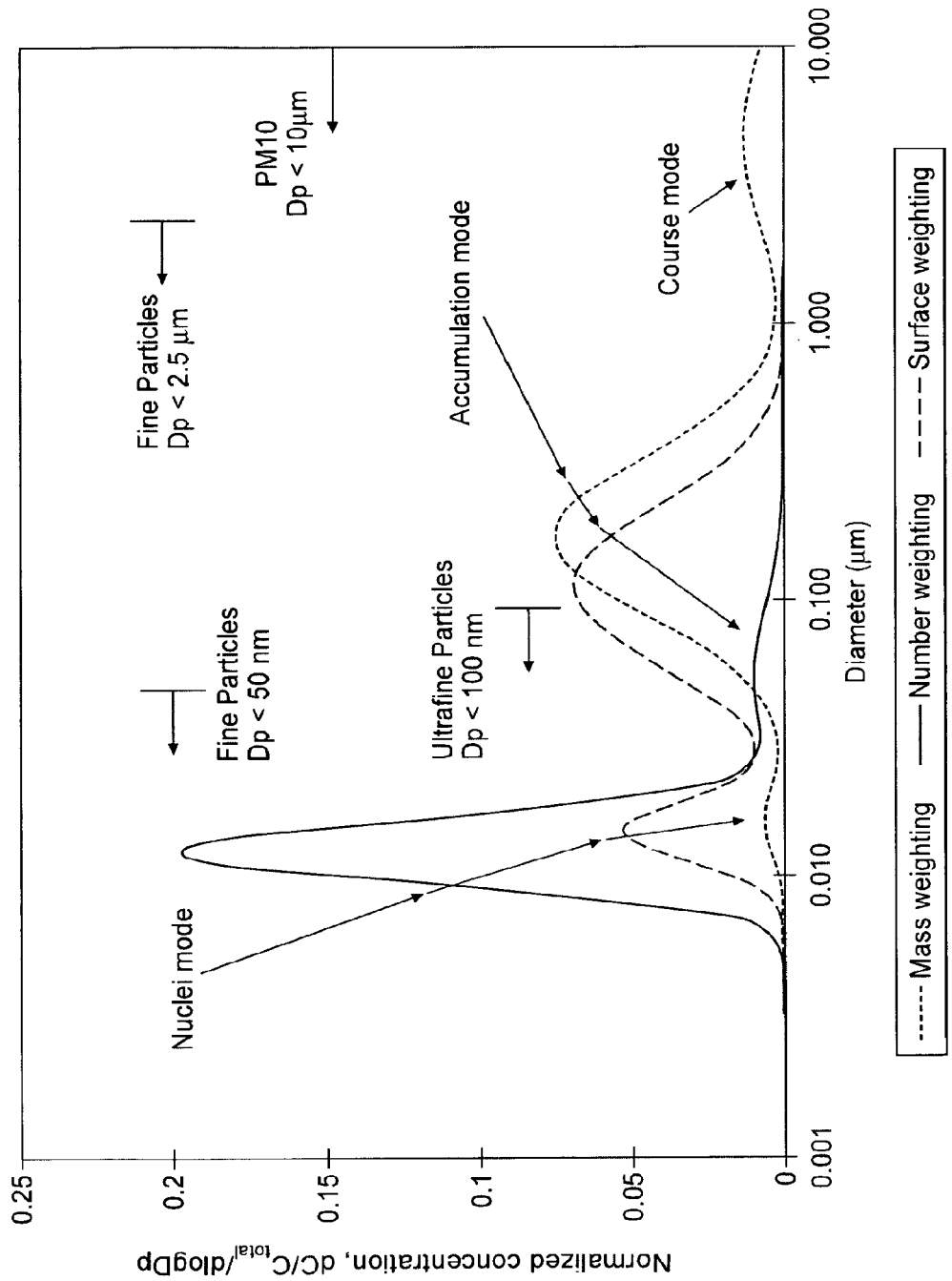
FIG. 1 is a graph showing the size distributions of PM in the exhaust gas of a diesel engine. For comparison, a gasoline size distribution is shown at FIG. 4 of SAE 1999-01-3530.
Figure 2A:
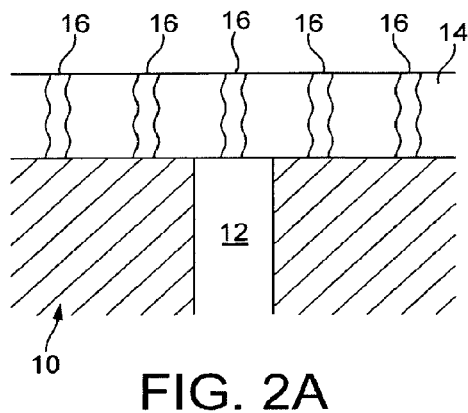
FIGS. 2A and 2B show schematic drawings of three embodiments of washcoated porous filter substrates according to the invention.

In a first, preferred embodiment, the filter comprises a surface washcoat, wherein a washcoat layer substantially covers surface pores of the porous structure and the pores of the washcoated porous substrate are defined in part by spaces between the particles (interparticle pores) in the washcoat. That is, substantially no washcoat enters the porous structure of the porous substrate. Methods of making surface coated porous filter substrates include introducing a polymer, e.g. poly vinyl alcohol (PVA), into the porous structure, applying a washcoat to the porous filter substrate including the polymer and drying, then calcining the coated substrate to burn out the polymer. A schematic representation of the first embodiment is shown in FIG. 2A.

Methods of coating porous filter substrates are known to the skilled person and include, without limitation, the method disclosed in WO 99/47260, i.e. a method of coating a monolithic support, comprising the steps of (a) locating a containment means on top of a support, (b) dosing a pre-determined quantity of a liquid component into said containment means, either in the order (a) then (b) or (b) then (a), and (c) by applying pressure or vacuum, drawing said liquid component into at least a portion of the support, and retaining substantially all of said quantity within the support. Such process steps can be repeated from another end of the monolithic support following drying of the first coating with optional firing/calcination.

In this first embodiment, an average interparticle pore size of the porous washcoat is 5.0 nm to 5.0 μm, such as 0.1-1.0 μm.

A D90 of solid washcoat particles in this first surface coating embodiments can be greater than the mean pore size of the porous filter substrate and can be in the range 10 to 40 μm, such as 15 to 30 μm or 12 to 25 μm. "D90" as used herein defines the particle size distribution in a washcoat wherein 90% of the particles present have a diameter within the range specified. Alternatively, in embodiments, the mean size of the solid washcoat particles is in the range 1 to 20 μm. It will be understood that the broader the range of particle sizes in the washcoat, the more likely that washcoat may enter the porous structure of the porous substrate. The term "substantially no washcoat enters the porous structure of the substrate" should therefore be interpreted accordingly.

Figure 2B:
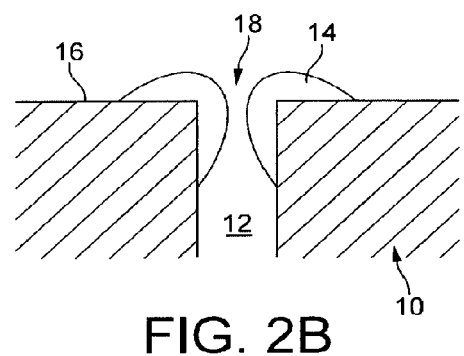

According to a second embodiment, the washcoat can be coated on inlet and/or outlet surfaces and also within the porous structure of the porous substrate. We believe that a surface coating around a pore opening at the inlet and/or outlet surfaces, thereby narrowing the e.g. surface pore size of a bare filter substrate, promotes interaction of the gas phase including PM without substantially restricting the pore volume, so not giving rise to significant increases in back pressure. That is, the pores at a surface of the porous structure comprise a pore opening and the washcoat causes a narrowing of substantially all the pore openings. A schematic representation of the second embodiment is shown in FIG. 2B.

Methods of making a filter according to the second embodiment can involve appropriate formulation of the washcoat known to the person skilled in the art including adjusting viscosity and surface wetting characteristics and application of an appropriate vacuum following coating of the porous substrate (see also WO 99/47260).

In our research and development work we have found that coated filters according to the first or second embodiments can be obtained by dip coating in a washcoat composition followed by draining the coated part, then application of a low vacuum to remove excess washcoat before drying and calcining. This method produces a surface coating (as determined by scanning electron microscope (SEM)) and in this respect distinguishes the coated filter wherein the SCR catalyst "permeates" the filter walls, as disclosed in EP 1663458.

In the first and second embodiments, wherein at least part of the washcoat is coated on inlet and/or outlet surfaces of the porous substrate, the washcoat can be coated on the inlet surfaces, the outlet surfaces or on both the inlet and the outlet surfaces. Additionally either one or both of the inlet and outlet surfaces can include a plurality of washcoat layers, wherein each washcoat layer within the plurality of layers can be the same or different, e.g. the mean pore size in a first layer can be different from that of a second layer. In embodiments, washcoat intended for coating on outlet surfaces is not necessarily the same as for inlet surfaces.

Where both inlet and outlet surfaces are coated, the washcoat formulations can be the same or different. Where both the inlet and the outlet surfaces are washcoated, the mean pore size of washcoat on the inlet surfaces can be different from the mean pore size of washcoat on the outlet surfaces. For example, the mean pore size of washcoat on the inlet surfaces can be less than the mean pore size of washcoat on the outlet surfaces. In the latter case, a mean pore size of washcoat on the outlet surfaces can be greater than a mean pore size of the porous substrate.

Whilst it is possible for the mean pore size of a washcoat applied to inlet surfaces to be greater than the mean pore size of the porous substrate, it is advantageous to have washcoat having smaller pores than the porous substrate in washcoat on inlet surfaces to prevent or reduce any combustion ash or debris entering the porous structure.

In the second embodiment, wherein at least part of the washcoat is in the porous structure, a size, e.g. a mean size, of the solid washcoat particles can be less than the mean pore size of the porous filter substrate for example in the range 0.1 to 20 μm, such as 1 to 18 μm, 1 to 16 μm, 2 to 15 μm or 3 to 12 μm. In particular embodiments, the abovementioned size of the solid washcoat particles is a D90 instead of a mean size.

In further particular embodiments, the surface porosity of the washcoat is increased by including voids therein. Exhaust gas catalysts having such features are disclosed, e.g. in our WO 2006/040842 and WO 2007/116881.

By "voids" in the washcoat layer herein, we mean that a space exists in the layer defined by solid washcoat material. Voids can include any vacancy, fine pore, tunnel-state (cylinder, prismatic column), slit etc., and can be introduced by including in a washcoat composition for coating on the filter substrate a material that is combusted during calcination of a coated filter substrate, e.g. chopped cotton or materials to give rise to pores made by formation of gas on decomposition or combustion.

The average void ratio of the washcoat can be from 5-80%, whereas the average diameter of the voids can be from 0.2 to 500 μm, such as 10 to 250 μm.

Promoter metals can be selected from the group consisting of at least one of Cu, Hf, La, Au, In, V, lanthanides and Group VIII transition metals, such as Fe. The molecular sieve for use in the present invention can be an aluminosilicate zeolite, a metal-substituted aluminosilicate zeolite or a non-zeolitic molecular sieve. Metal substituted molecular sieves with application in the present invention include those having one or more metals incorporated into a framework of the molecular sieve e.g. Fe in-framework Beta and Cu in-framework CHA.

Where the molecular sieve is non-zeolitic molecular sieve, it can be an aluminophosphate molecular sieve selected from the group consisting of aluminophosphate (AlPO) molecular sieves, metal substituted aluminophosphate molecular sieves (MeAlPO) zeolites, silico-aluminophosphate (SAPO) molecular sieves and metal substituted silico-aluminophosphate (MeAPSO) molecular sieves.

In particular, the molecular sieve can be a small, medium or large pore molecular sieve. By "small pore molecular sieve" herein we mean a molecular sieve containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves with particular application in the present invention are any of those listed in Table 1 of WO2008/132452.

Specific examples of useful molecular sieves are selected from the group consisting of AEI, ZSM-5, ZSM-20, ERI, LEV, mordenite, BEA, Y, CHA, MCM-22 and EU-1.

The metal substitutent and/or the transition metal promoter can be selected from the group consisting of groups IB, IIB, IIIA, IIIB, VB, VIB, VIB and VIII of the periodic table.

In embodiments, the metal can be selected from the group consisting of Cr, Co, Cu, Fe, Hf, La, Ce, In, V, Mn, Ni, Zn, Ga and the precious metals Ag, Au, Pt, Pd and Rh.

Metals of particular interest for use as transition metal promoters in so-called $NH_3$—SCR are selected from the group consisting of Ce, Fe and Cu. Suitable nitrogenous reductants include ammonia. Ammonia can be generated in situ e.g. during rich regeneration of a NAC disposed upstream of the filter (see the alternatives to reactions (6) and (7) hereinabove). Alternatively, the nitrogenous reductant or a precursor thereof can be injected directly into the exhaust gas. Suitable precursors include amrnomum formate, urea and amrnomum carbamate. Decomposition of the precursor to ammonia and other by-products can be by hydrothermal or catalytic hydrolysis.

According to a further aspect, the invention provides an exhaust system for a compression ignition engine, which system comprising a filter according to the invention. Compression ignition engines for use in this aspect of the invention can be fuelled by diesel fuel, biodiesel fuel, blends of diesel and biodiesel fuels and compressed natural gas.

In one embodiment, the exhaust system comprises means for injecting a nitrogenous reductant or a precursor thereof, into exhaust gas upstream of the filter. In a particular embodiment, the nitrogenous reductant is a fluid.

In another aspect, the invention provides a compression ignition engine comprising an exhaust system according to the invention.

In a further aspect, the invention provides a method of trapping particulate matter (PM) from exhaust gas emitted from a compression ignition engine by depth filtration, which method comprising contacting exhaust gas containing the PM with a filter comprising a porous substrate having inlet and outlet surfaces, wherein the inlet surfaces are separated from the outlet surfaces by a porous structure containing pores of a first mean pore size, wherein the porous substrate is coated with a washcoat comprising a plurality of solid particles comprising a molecular sieve promoted with at least one metal wherein the porous structure of the washcoated porous substrate contains pores of a second mean pore size, and wherein the second mean pore size is less than the first mean pore size.

In a further aspect, the invention provides a method of adjusting filter backpressure in an exhaust system of a compression ignition engine by coating the filter with a first transition metal promoted molecular sieve SCR catalyst, testing the filter backpressure to determine whether it meets a predetermined backpressure requirement and selecting a second transition metal promoted molecular sieve SCR catalyst in order to reduce the backpressure in the system containing the filter coated with the first transition metal promoted molecular sieve SCR catalyst, wherein the pore size of the second molecular sieve is > the first molecular sieve.

FIGS. 2A and 2B show a cross-section through a porous filter substrate 10 comprising a surface pore 12. FIG. 2A shows a first embodiment, featuring a porous surface washcoat layer 14 comprised of solid washcoat particles, the spaces between which particles define pores (interparticle pores). It can be seen that the washcoat layer 14 substantially covers the pore 12 of the porous structure and that a mean pore size of the interparticle pores 16 is less than the mean pore size 12 of the porous filter substrate 10.

FIG. 2B shows a second embodiment comprising a washcoat that is coated on an inlet surface 16 and additionally within a porous structure 12 of the porous substrate 10. It can be seen that the washcoat layer 14 causes a narrowing of a pore openings of surface pore 12, such that a mean pore size 18 of the coated porous substrate is less than the mean pore size 12 of the porous filter substrate 10.

Figure 3:
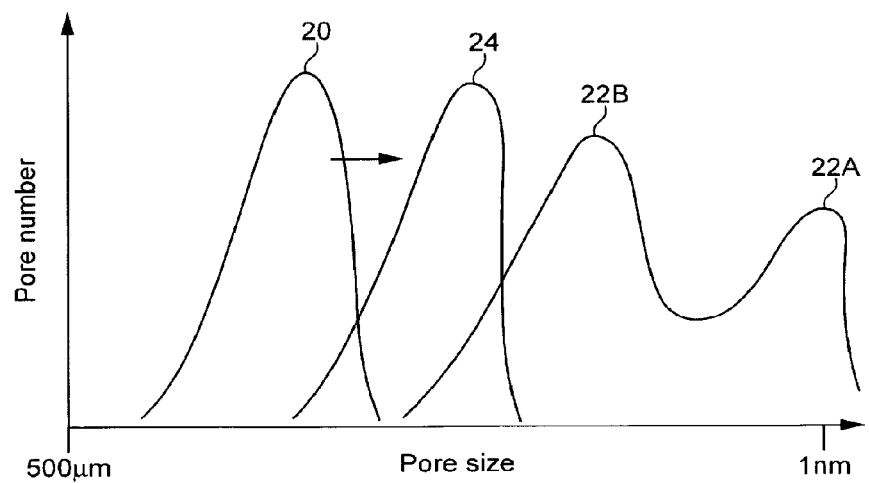
FIG. 3 is a schematic graph of mercury porosimetry relating the pore size distribution of a porous filter substrate, a porous washcoat layer and a porous filter substrate including a porous surface washcoat layer.

FIG. 3 shows an illustration of a graph relating pore size to pore number for a porous filter substrate 20, a porous washcoat layer 22 and a porous diesel filter substrate including a surface washcoat layer 24. It can be seen that the filter substrate has a mean pore size of the order of about 15 µm. The washcoat layer has a bimodal distribution comprised of intraparticle pores 22A (at the nanometer end of the range) and interparticle pores 22B towards the micrometer end of the scale. It can also be seen that by coating the porous filter substrate with a washcoat according to the invention that the pore distribution of the bare filter substrate is shifted in the direction of the interparticle washcoat pore size (see arrow).

EXAMPLES

The following Examples are provided by way of illustration only. In the Examples, the Soot Loading Back Pressure ("SLBP") test uses the apparatus and method described in EP 1850068, i.e.:

(i) an apparatus for generating and collecting particulate matter derived from combusting a liquid carbon-containing fuel, which apparatus comprising a fuel burner comprising a nozzle, which nozzle is housed in a container, which container comprising a gas inlet and a gas outlet, said gas outlet connecting with a conduit for transporting gas from the gas outlet to atmosphere, means for detecting a rate of gas flowing through the gas inlet and means for forcing an oxidising gas to flow from the gas inlet via the container, the gas outlet and the conduit to atmosphere, a station for collecting particulate matter from gas flowing through the conduit and means for controlling the gas flow-forcing means in response to a detected gas flow rate at the gas inlet, whereby the rate of gas flow at the gas inlet is maintained at a desired rate to provide substoichiometric fuel combustion within the container, thereby to promote particulate matter formation; and (ii) a method of generating and collecting particulate matter derived from combusting liquid carbon-containing fuel in an oxidising gas, which method comprising burning the fuel in a substoichiometric quantity of oxidising gas in a fuel burner, said fuel burner comprising a nozzle, which nozzle being housed in a container, forcing an oxidising gas to flow from a gas inlet to the container to atmosphere via a gas outlet to the container and a conduit connected to the gas outlet, collecting particulate matter at a station located within the conduit, detecting a rate of oxidising gas flow at the gas inlet and controlling the rate of oxidising gas flow so that a desired rate of oxidising gas flow is maintained at the gas inlet.

The filter is inserted in the station for collecting particulate matter from gas flowing through the conduit. The fresh filter is first pre-conditioned at an air flow rate 80 kg/hr in a lean burn combustion stream using low sulphur diesel fuel (10 ppm S) to raise the filter inlet temperature to 650° C., a temperature that is typically used on a vehicle to regenerate a soot-loaded filter. This pre-conditioning step temperature is well above the soot combustion temperature and is to ensure that the filter on test is clean at the outset. Pressure sensors disposed upstream and downstream of the station monitor the backpressure across the filter.

Figure 4:
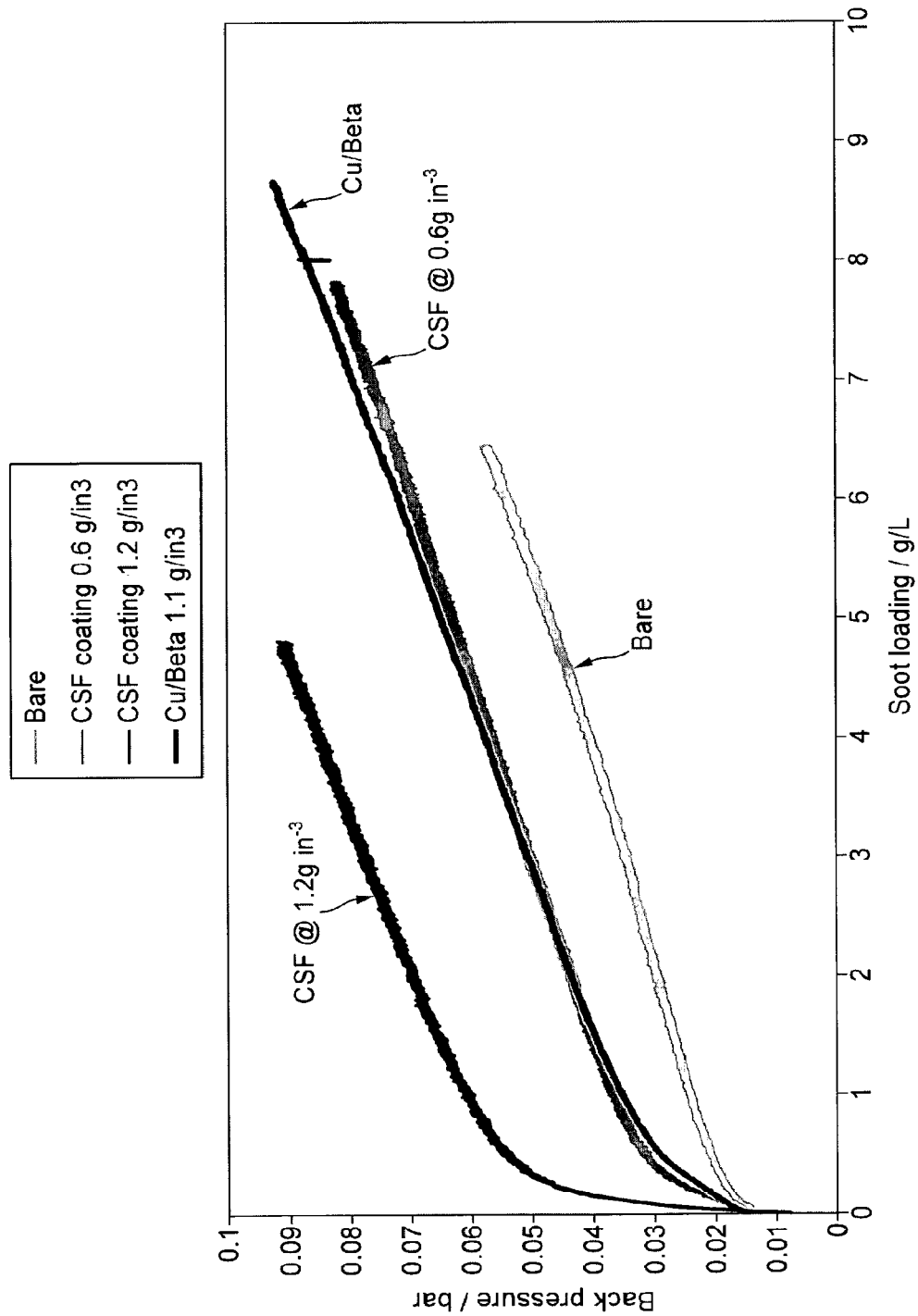
FIG. 4 is a graph showing the results of a Soot Loading Back Pressure study comparing backpressure against soot loading for 5.66 inch×6 inch SiC wallflow filters coated with two different oxidation catalyst washcoat loadings (g/in$^3$) and a bare filter (all not according to the invention) with a Fe/beta zeolite selective catalytic reduction (SCR) catalyst (according to the invention) at a comparable washcoat loading.
Figure 5:
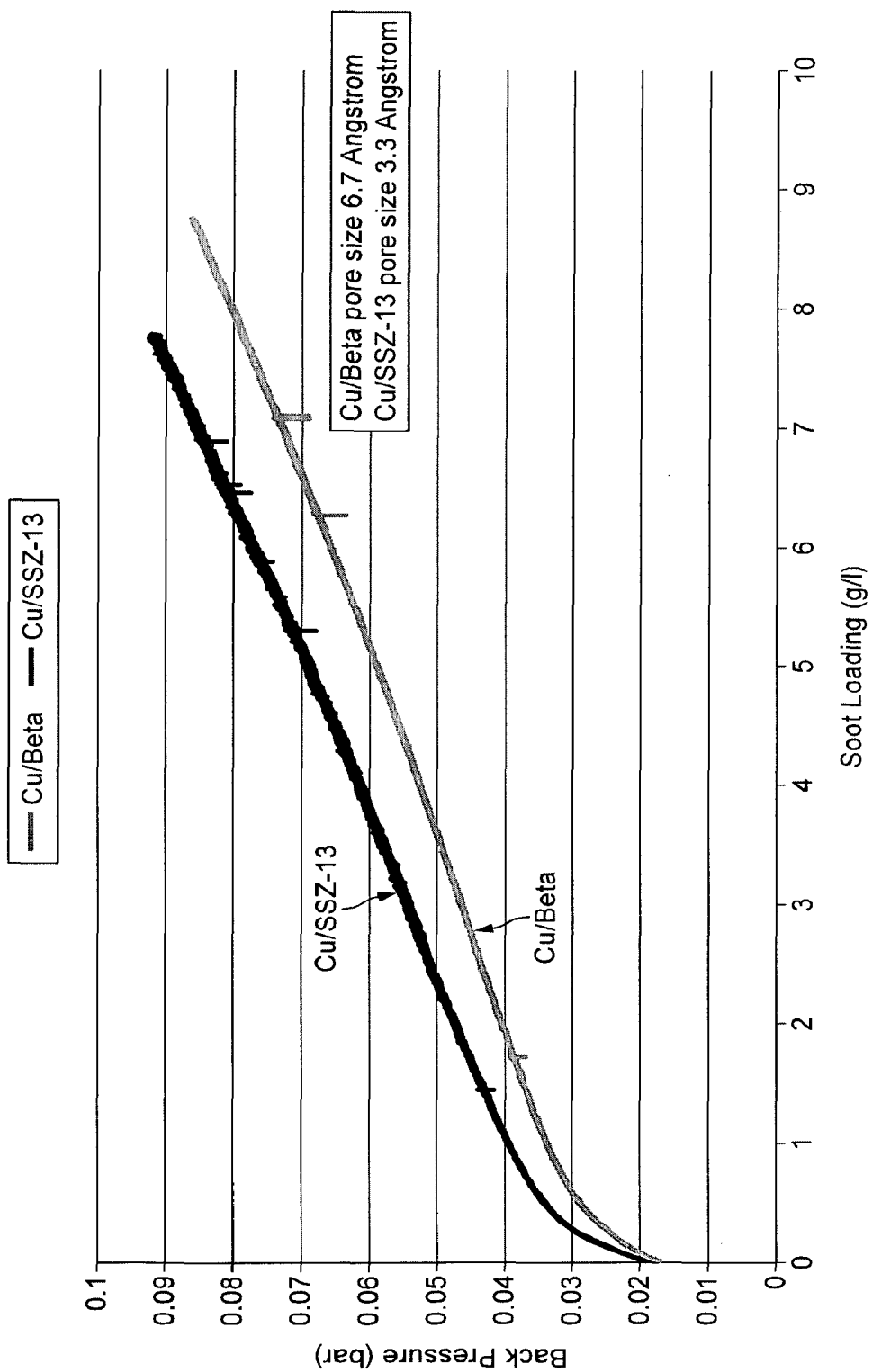
FIG. 5 is a graph comparing the backpressure in the same Soot Loading Back Pressure test for a Cu/SSZ-13 zeolite (a small pore zeolite) catalyst and a Fe/Beta zeolite (a large pore zeolite) SCR catalyst.
Figure 6:
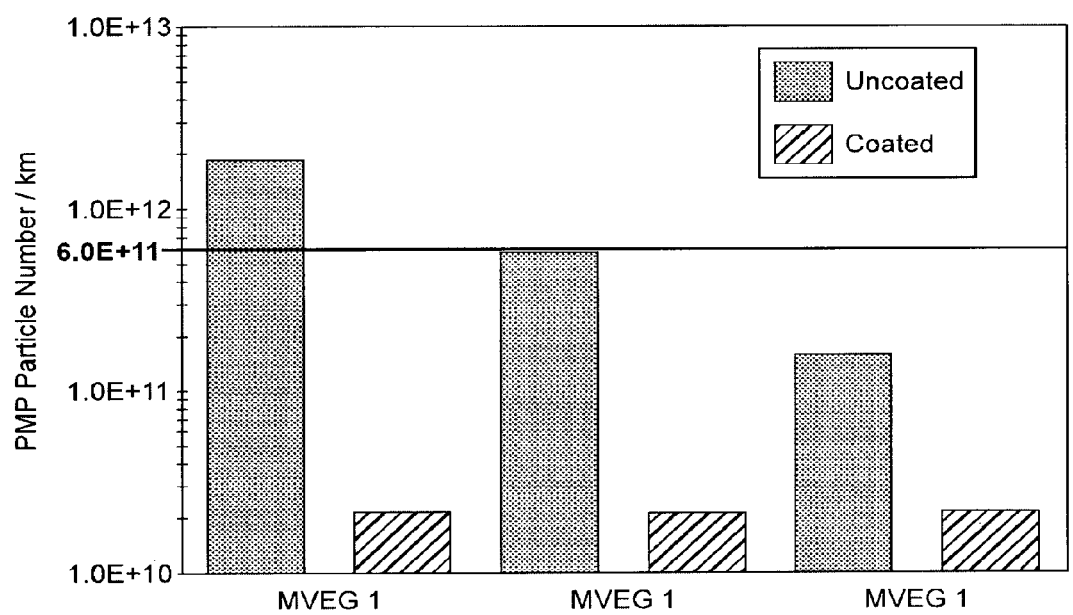
FIG. 6 is a bar chart comparing the particulate number emissions (particulate number per kilometer) from a 2.0 liter Euro 5 compliant light duty diesel vehicle fitted with standard diesel oxidation catalyst followed by a 3.0 liter SiC filter at 23 µm nominal mean pore size coated with a Fe/Beta zeolite SCR catalyst for meeting the Euro 5/6 particle number emission limit of 6×10$^{11}$ km$^{-1}$ (UN/ECE Particulate Measurement Programme (PMP)) with the same system containing a bare filter.

The backpressure against time is plotted in the accompanying FIGS. 4-6. The SLBP test is carried out at a filter inlet temperature of 250° C. at air flow rate of 180 kg/hour combusting low sulphur diesel fuel (10 ppm S).

Example 1

CSF and SCR Catalyst Coated Filter Backpressure Comparison

Three commercially available uncoated 5.66 inch×6 inch SiC wallflow filters having 60% porosity and a mean pore size of 20-25 μm were each coated, separately, with a catalyst washcoat for a catalysed soot filter (CSF) comprising precious metal supported on an alumina-based metal oxide and an Cu/Beta zeolite selective catalytic reduction (SCR) catalyst coating. The CSF coating was obtained according to the method disclosed in WO 99/47260, i.e. a method of coating a monolithic support, comprising the steps of (a) locating a containment means on top of a support, (b) dosing a pre-determined quantity of a liquid component into said containment means, either in the order (a) then (b) or (b) then (a), and (c) by applying pressure or vacuum, drawing said liquid component into at least a portion of the support, and retaining substantially all of said quantity within the support. The coated product was dried and calcined and then the process steps were repeated from another end of the wallflow filter. The SCR coated filter was obtained by dip coating followed by draining, the application of a low vacuum to remove excess washcoat before drying and calcining. This method produces a surface coating (as determined by scanning electron microscope (SEM)) and in this respect distinguishes the coated filter wherein the SCR catalyst "permeates" the filter walls, as disclosed in EP 1663458. Two different CSF washcoat loadings were obtained, at 0.6 g/in$^3$ and 1.2 g/in$^3$. The SCR coated filter was washcoated at a loading of at 1.1 g/in$^3$.

The three coated filters were tested using the SLBP test, a fourth, uncoated filter was used as a control. The results are shown in FIG. 4, from which it can be seen that the CSF coating at approximately the same washcoat loading has considerably higher backpressure compared to the SCR coated filter. We conclude, therefore, that there is an inherent coating porosity difference between CSF and SCR coated filter.

Example 2

SCR Catalyst Coated Filter Backpressure Comparison

Identical commercially available 5.66 inch×7.5 inch SiC wallflow filters having 60% porosity and a mean pore size of 20-25 μm were washcoated to a loading of 1.1 g/in$^3$ with Cu/SSZ-13 zeolite and Cu/Beta zeolite SCR catalysts, each catalyst having the same particle size D90 (90% of particles in washcoat having a particle size) at between 4.8-5 μm but apart from the transition metal/zeolite were in all other respects were substantially identical. The method of manufacture was to dip coat the part followed by draining, the application of a low vacuum to remove excess washcoat and then drying and calcining. A SLBP test was done to compare the finished parts.

The results are presented in FIG. 5, from which it can be seen that the filter coated with the Cu/Beta zeolite catalyst has a lower rate of backpressure increase than the filter coated with the Cu/SSZ-13 zeolite catalyst. Since the fundamental difference between the two SCR catalysts is that the pore size of the SSZ-13 zeolite is 3.8×3.8 Angstroms and 5.6-7.7 Angstroms for the Beta zeolite (source: Structure Commission of the International Zeolite Association), we conclude that it is possible to adjust backpressure in the exhaust system, thereby increasing design options, by selecting a molecular sieve-based SCR catalyst having an appropriate pore size to achieve the desired backpressure objective and at the same time meeting emission standards for NOx.

Example 3

Vehicle Testing

A 3.0 liter capacity SiC filter at 58% porosity and 23 μm nominal mean pore size Cu/Beta zeolite SCR catalyst coated filter manufactured by the dip coating method described in Example 1 was inserted into an exhaust system of a 2.0 liter Euro 5 compliant light duty diesel vehicle behind a standard diesel oxidation catalyst. The vehicle containing the fresh (i.e. unaged) catalysed filter was then driven over the MVEG-B drive cycle, then the EUDC part of the MVEG-B cycle three times consecutively to pre-condition the filter.

In Europe, since the year 2000 (Euro 3 emission standard) emissions are tested over the New European Driving Cycle (NEDC). This consists of four repeats of the previous ECE 15 driving cycle plus one Extra Urban Driving Cycle (EUDC) with no 40 second warm-up period before beginning emission sampling. This modified cold start test is also referred to as the "MVEG-B" drive cycle. All emissions are expressed in g/km.

The Euro 5/6 implementing legislation introduces a new PM mass emission measurement method developed by the UN/ECE Particulate Measurement Programme (PMP) which adjusts the PM mass emission limits to account for differences in results using old and the new methods. The Euro 5/6 legislation also introduces a particle number emission limit (PMP method), in addition to the mass-based limits. The new Euro 5/6 particle number emission limit of $6\times10^{11}$ km$^{-1}$ using the PMP protocol allows for pre-conditioning of the system prior testing the system to determine whether it meets the emission standard over the MVEG-B drive cycle.

Repeated cold MVEG-B cycles were then run using the pre-conditioned system. The coated filter was exchanged in the system for an uncoated filter as a control. The results are shown as a bar chart in FIG. 6 comparing the particulate number emissions (particulate number per kilometer) from which it can be seen that despite pre-conditioning, which would be expected to develop a soot cake providing improved filtration, the uncoated filter initially failed the particle number emission limit of $6\times10^{-11}$ km$^{-1}$, but with repeated drive cycles the particle number came down consistently to within the emission standard. By contrast it can be seen that the coated filter is well within the emission standard from the first drive cycle following pre-conditioning. We interpret these data to mean that the coated filter promotes soot caking that improves diesel particulate filtration and therefore a more immediate reduction in particle number, yet—as is seen in Example 2—the Cu/Beta zeolite coated filter provides a lower backpressure compared with the Cu/SSZ-13 zeolite SCR catalyst or a CSF coating at a similar washcoat loading (see Example 1). Accordingly, the surface Cu/Beta SCR catalyst coating takes away the requirement to have a soot layer on a higher porosity/mean pore size filter before filtration occurs. Accordingly, the invention provides benefits for particle number reduction in "real world" driving conditions, as opposed to the idealised drive cycle conditions set for meeting emission standards.

For the avoidance of any doubt, the entire contents of all prior art documents cited herein is incorporated herein by reference.

The invention claimed is:

1. A filter for removing particulate matter from exhaust gas comprising:
   a. a filter comprising a porous substrate having inlet surfaces and outlet surfaces, wherein the inlet surfaces are separated from the outlet surfaces by the porous substrate;
   b. a first catalyst washcoat on the inlet surfaces, wherein the first catalyst washcoat has a mean particle size greater than the mean pore size of the filter;
   c. a second catalyst washcoat within the porous substrate, wherein the second catalyst washcoat has a mean particle size less than the mean pore size of the porous filter.

2. The filter of claim 1, wherein the first catalyst washcoat has a mean particle size of 10 to 40 µm.

3. The filter of claim 1, wherein the second catalyst washcoat has a mean particle size of 0.1 to 20 µm.

4. The filter of claim 1, wherein the first catalyst washcoat has a $D_{90}$ particle size of 10 to 40 µm second catalyst washcoat has a $D_{90}$ particle size of 3 to 12 µm.

5. The filter of claim 1, wherein a least one of the first catalyst washcoat and the second catalyst washcoat comprise platinum and/or palladium on a high surface area support.

6. The filter of claim 1, wherein filter further comprises a third catalyst washcoat on the outlet surface.

* * * * *